US010303684B1

(12) United States Patent
Kurihara (10) Patent No.: US 10,303,684 B1
(45) Date of Patent: May 28, 2019

(54) RESOURCE SCORING ADJUSTMENT BASED ON ENTITY SELECTIONS

(71) Applicant: Google LLC, Mountain View, CA (US)

(72) Inventor: Kenichi Kurihara, Tokyo (JP)

(73) Assignee: Google LLC, Mountain View, CA (US)

( * ) Notice: Subject to any disclaimer, the term of this patent is extended or adjusted under 35 U.S.C. 154(b) by 1348 days.

(21) Appl. No.: 14/011,463

(22) Filed: Aug. 27, 2013

(51) Int. Cl.
*G06F 16/951* (2019.01)
*G06F 16/955* (2019.01)
*G06F 16/2453* (2019.01)

(52) U.S. Cl.
CPC ........ *G06F 16/2453* (2019.01); *G06F 16/951* (2019.01); *G06F 16/955* (2019.01)

(58) Field of Classification Search
None
See application file for complete search history.

(56) References Cited

U.S. PATENT DOCUMENTS

| | | | | |
|---|---|---|---|---|
| 8,645,362 B1* | 2/2014 | Jain | ............... | G06F 17/30864 707/723 |
| 2005/0203888 A1* | 9/2005 | Woosley | ............ | G06F 17/30864 |
| 2006/0173830 A1* | 8/2006 | Smyth | ............... | G06F 17/30864 |
| 2007/0061297 A1* | 3/2007 | Bihun | ............... | G06F 17/30864 |
| 2009/0182725 A1* | 7/2009 | Govani | ............ | G06F 17/30864 |
| 2010/0153404 A1* | 6/2010 | Ghosh | ............... | G06F 17/30699 707/748 |
| 2011/0022600 A1* | 1/2011 | Sathe | ............... | G06F 17/30622 707/742 |
| 2012/0054185 A1* | 3/2012 | Johnson | ............ | G06F 17/30705 707/739 |
| 2012/0109941 A1* | 5/2012 | Cohen | ............... | G06F 17/30864 707/722 |
| 2012/0203758 A1* | 8/2012 | Yu | ..................... | G06F 17/30864 707/709 |
| 2012/0226661 A1* | 9/2012 | Kenthapadi | ....... | G06F 17/30864 707/634 |
| 2012/0317088 A1 | 12/2012 | Pantel et al. | | |

(Continued)

OTHER PUBLICATIONS

Mottin et al., "Entity Ranking Using Click-Log Information" (online) (retrieved on Aug. 23, 2013) retrieved from internet: http://disi.unitn.it/~velgiasidocs/MottinPV13.pdf, 26 pages.

(Continued)

*Primary Examiner* — Alford W Kindred
*Assistant Examiner* — Soheila (Gina) Davanlou
(74) *Attorney, Agent, or Firm* — Fish & Richardson P.C.

(57) ABSTRACT

Methods, systems, and apparatus, including computer programs encoded on a computer storage medium, are provided for resource scoring adjustment based on entity selection. In one aspect, a method includes the actions of accessing resource data that specifies, for each of a plurality of resources, a resource identifier and one or more referenced entities, and accessing search term data that specifies a plurality of search terms, and for each search term, a selection value for each resource, each selection value being based on user selections of search results that referenced the resource to which the selection value corresponds. From the resource data and search term data, for each search term and each entity, a search term-entity selection value is determined that is based on the selection values of resources that reference the entity and that were referenced by search results in response to a query that included the search term.

17 Claims, 4 Drawing Sheets

(56) References Cited

U.S. PATENT DOCUMENTS

2013/0103679 A1* 4/2013 Lupoli .................. G06Q 10/08
707/723
2013/0173574 A1* 7/2013 Park .................... H04L 47/2483
707/706

OTHER PUBLICATIONS

Pantel and Fuxman, "Jigs and Lures: Associating Web Queries with Structured Entities" Proceedings of the 49th Annual Meeting of the Association for Computational Linguistics, 2011, pp. 83-92.
Irmak et al., "Contextual Ranking of Keywords Using Click Data" Data Engineering, 2009. ICDE '09. IEEE 25th International Conference, 12 pages.
Jain and Pennacchiotti, "Open Entity Extraction from Web Search Query Logs", Proceedings of the 23rd International Conference on Computational Linguistics (Coling 2010), pp. 510-518.

* cited by examiner

RESOURCE SCORING ADJUSTMENT BASED ON ENTITY SELECTIONS

BACKGROUND

This specification relates to digital information retrieval, and particularly to search processing.

The Internet enables access to a wide variety of resources, such as video or audio files, web pages for particular subjects, book articles, or news articles. A search engine can identify resources in response to a user query that includes one or more search terms or phrases. The search engine ranks the resources based on their relevance to the query and importance and provides search results that link to the identified resources. The search results are typically ordered according to the rank, and are provided to user devices according to the rank.

Search engines score resources based on a variety of factors. Examples of such factors include an information retrieval score and an authority score. The information retrieval score is a measure of relevance of a query to resource content, and the authority score is a measure of importance of a resource relative to other resources.

Additional factors can also be used to score resources, or to adjust resource scores after scoring by the search engine. One example is user feedback. Resources that tend to satisfy users' informational needs are typically selected more frequently than resources that do not tend to satisfy users' informational needs for certain queries. Search and selection data are stored by the search engine, and thus the search engine can determine, for certain queries, which resources tend to better satisfy users' informational needs. Based on this information, the search scores can be adjusted so that better performing resources receive a scoring "boost."

Some resources, however, do not have a sufficient corpus of search and selection data from which an inference of performance can be drawn. For example, a newly published resource initially has no associated search and selection data.

SUMMARY

In general, one innovative aspect of the subject matter described in this specification can be embodied in methods that include the actions of accessing, by a data processing apparatus, resource data that specifies, for each of a plurality of resources, a resource identifier that uniquely identifies the resource, and one or more entities referenced in the resource; accessing, by the data processing apparatus, search term data that specifies a plurality of search terms, and for each search term, a selection value for each resource, each selection value being based on user selections of search results that referenced the resource to which the selection value corresponds; determining, by the data processing apparatus, from the resource data and search term data, for each search term and each entity, a search term-entity selection value that is based on the selection values of resources that reference the entity and that were referenced by search results in response to a query that included the search term; and storing, by the data processing apparatus, the search term-entity selection values in a data storage. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Resources that do not have sufficient search and selection data from which a reliable performance inference can be drawn can still be boosted or demoted with a high degree of accuracy based on the search term-entity selection values. This also increases coverage of behavioral based scoring adjustments to resources for which very little behavioral data is available.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
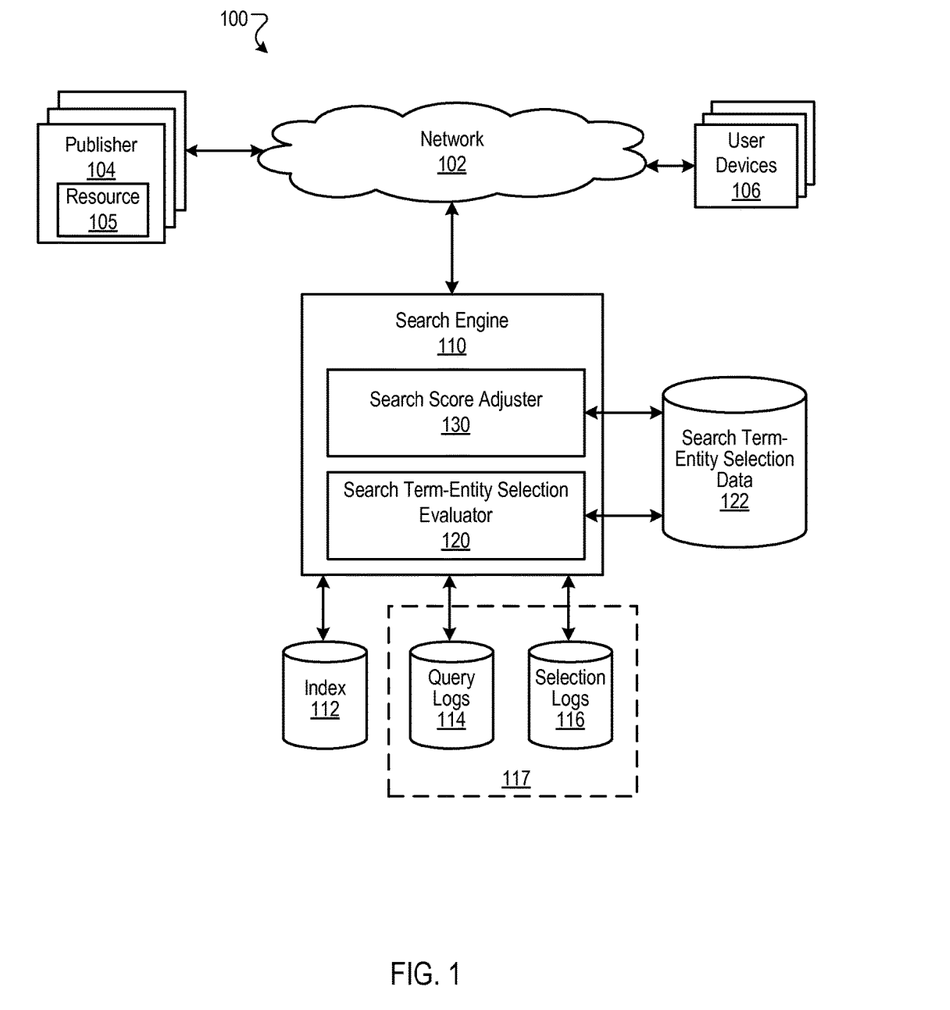
FIG. 1 is block diagram of an example environment in which search term-entity selection values are used to adjust resource rankings for search operations.

FIG. 1 is block diagram of an example environment 100 in which search term-entity selection values are used to adjust resource rankings for search operations. A computer network 102, such as a local area network (LAN), wide area network (WAN), the Internet, or a combination thereof, connects publisher web sites 104, user devices 106, and a search engine 110. The online environment 100 may include many thousands of publisher web sites 104 and user devices 106.

A publisher web site 104 includes one or more resources 105 associated with a domain and hosted by one or more servers in one or more locations. Generally, a web site is a collection of web pages formatted in hypertext markup language (HTML) that can contain text, images, multimedia content, and programming elements, for example, scripts. Each web site 104 is maintained by a content publisher, which is an party that controls, manages and/or owns the web site 104.

A resource is any data that can be provided by a publisher web site 104 over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a web site on the world wide web or a local area network.

To facilitate searching of these resources 105, the search engine 110 identifies the resources by crawling the publisher web sites 104 and indexing the resources provided by the publisher web sites 104. The resources are indexed and the index data are stored in an index 112. In some implementations, the search engine 110 can identify one or more entities referenced by each of the resources 105, and can annotate each resource with one or more entity identifiers. An entity is an identifiable thing or concept. For example, entities are topics of discourse, are concepts or things that can be referred to by a text fragment, and are distinguishable from one another, e.g., based on context, or instances of noun classes, such as persons, places, or things.

The user devices 106 submit search queries to the search engine 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results and returns the search results to the user devices 106 in a search results page resource. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

In some implementations, the queries submitted from user devices 106 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken responsive to search results provided by the search engine 110. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices, the search results provided and the resources selected by the search results, and the actions taken in response to the queries, and how often the queries have been submitted. Aggregated user behavior data derived from the search history data 117 can be used by the search engine 110, for example, as a factor in ranking resources for presentation in association with search results. In general, resources associated with positive user behavior data for a particular query (e.g., a high selection rate) may be boosted, whereas resources associated with negative data may be demoted, when identifying search results to be presented in response to a similar query.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

As described above, the search engine 110 can use historical behavioral search data to boost or demote particular resources when ranking resources. However, some of those resources 105 (e.g., newly added resources) may have little or no search history data 117 associated with them. Accordingly, in some implementations, the search engine 110 can determine resource scoring adjustment based on entity selections for particular queries. For example, the search engine 110 can include a search term-entity selection evaluator 120 and a search score adjuster 130 to adjust the ranking of resources, based at least in part on entities referenced by the resources. Other software architectures that include more or fewer engines or modules can be used.

In general, each of the resources 105 may reference (e.g., through text content, audio, video, images, labels, etc.) one or more entities, and may be annotated with identifiers associated with each of the referenced entities. The search term-entity selection evaluator 120, for example, can access the query logs 114 and selection logs 116 and the search index 112, and for each of the resources 105, the search term-entity selection evaluator can generate search term-entity selection data 122 which describes for each search term (e.g., word, phrase, n-gram token, etc.) of a search query, how often resources which reference particular entities have been selected for that query. The search score adjuster 130, for example, can access the search term-entity selection data 122 and can adjust the ranking of the resources 105 based at least in part on the data.

A more detailed description of the operation of the search term-entity selection evaluator 120 and the search score adjuster 130 is described with reference to FIG. 2.

Figure 2:
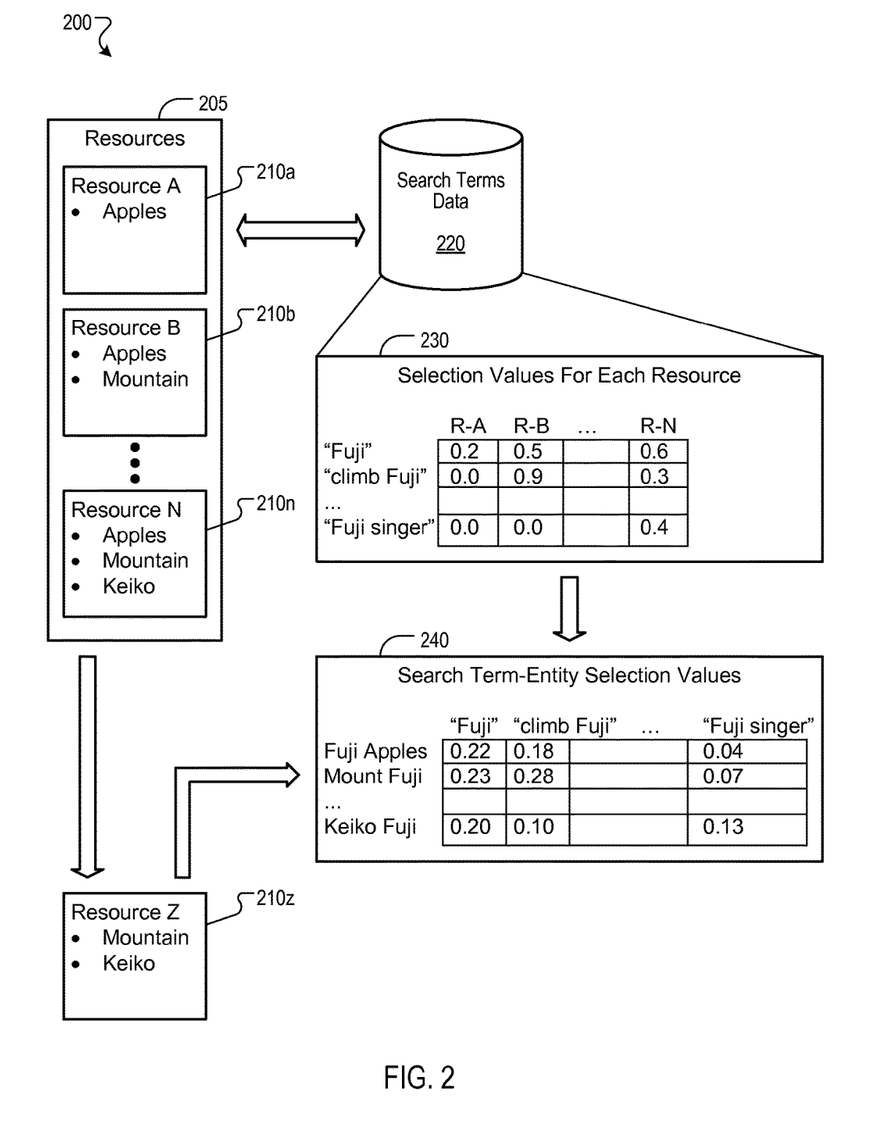
FIG. 2 is a system flow diagram of a process for determining search term-entity selection values and adjusting resource rankings based on the search term-entity selection values.

FIG. 2 is a system flow diagram of an example process 200 for determining search term-entity selection values and adjusting resource rankings based on the search term-entity selection values. Operation of the system flow of FIG. 2 is also described with reference to FIGS. 3 and 4.

Figure 3:
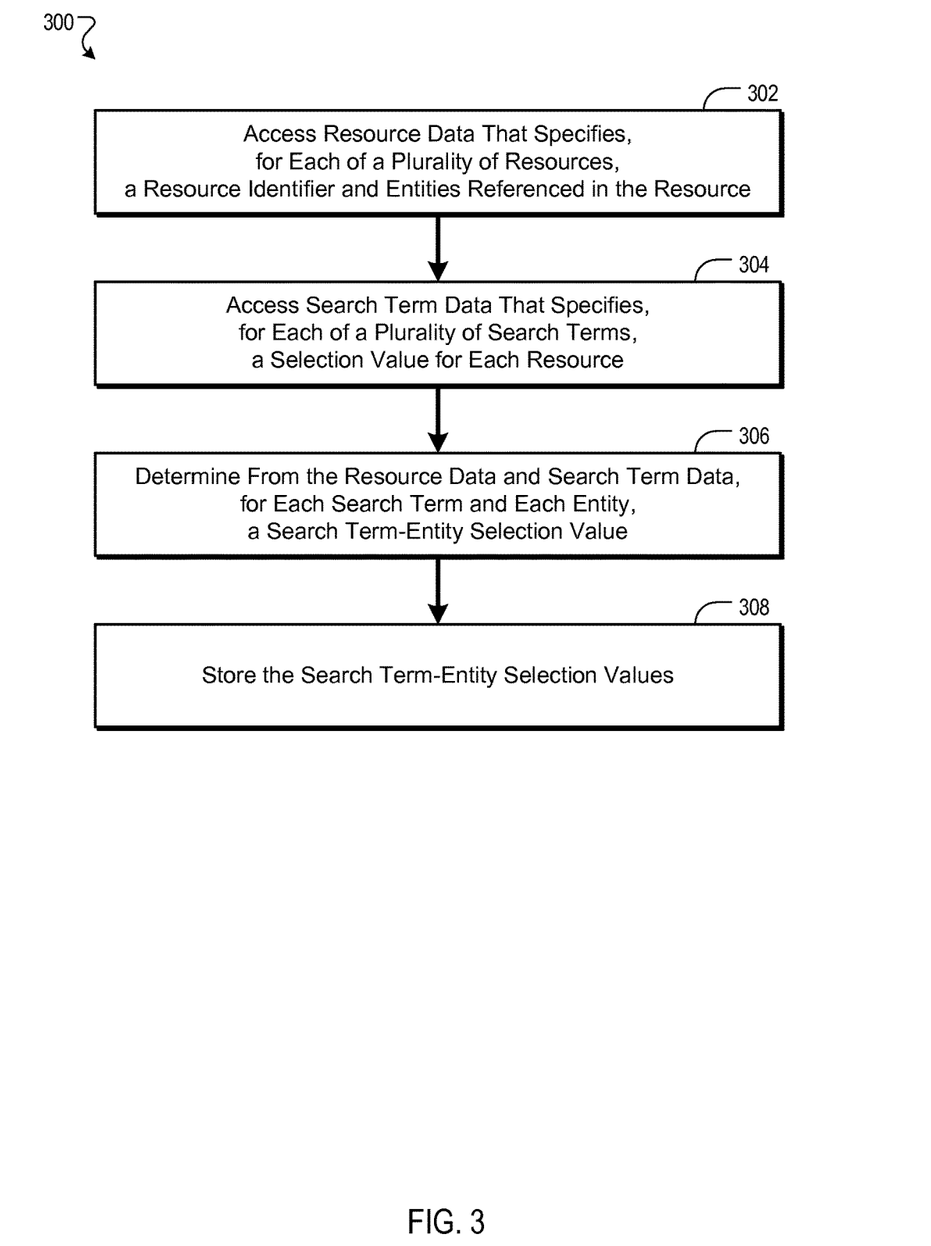
FIG. 3 is a flow diagram of an example process for determining search term-entity selection values.

With respect to FIG. 3, an example process 300 is described for determining search term-entity selection values. The process 300 can be implemented by data processing apparatus such as the search engine 110 (shown in FIG. 1) and the search term-entity selection evaluator 120 (also shown in FIG. 1), for example.

Resource data is accessed (302). For example, the search term-entity selection evaluator 120 can access resource data (e.g., data stored by the index 112) that specifies for each of the resources 105, a resource identifier that uniquely identifies the resource, and one or more entities referenced in the resource. Each of the entities, for example, can be an instance of a noun class, such as a person (e.g., an individual, such as Keiko Fuji), place (e.g., a location, such as Mount Fuji), or thing (e.g., Fuji apples).

Referring to FIG. 3, for example, a corpus of resources 205 includes a resource 210a (identified as "Resource A"), a resource 210b (identified as "Resource B"), and a resource 210n (identified as "Resource N"). In the present example, "Resource A" references a single entity (e.g., Fuji apples), "Resource B" references two entities (e.g., Fuji apples and Mount Fuji), and "Resource N" references three entities (e.g., Fuji apples, Mount Fuji, and Keiko Fuji). In some implementations, weight scores may be determined for each of the entities referenced by a resource. If a resource references a single entity, for example, that entity may be associated with a full weight score for the resource. As another example, if a resource references multiple entities, each entity may be associated with a weight score proportional to its significance (e.g., percentage of content) within the resource.

Search term data is identified (304). For example, the search term-entity selection evaluator 120 can access the search terms data 220 (e.g., including query logs and selection logs, similar to the search history data 117 described with respect to FIG. 1) that specifies a plurality of search terms, and for each search term, a selection value for each resource. In the present example, selection values 230 can be identified for various search terms (e.g., "Fuji", "climb Fuji", "Fuji singer", etc.) for each of the resources 205 (e.g., "Resource A", "Resource B", and "Resource N"). In some implementations, search terms can be search queries provided by users. In some implementations, search terms can include words, phrases, n-grams, etc., derived from the search queries. For example, common stop words (e.g., "the", "is", "at", etc.) can be filtered from search queries provided by users, the queries can be tokenized (e.g., split into unigram and bigram units), and search terms data 220 can be maintained for each of the generalized search terms.

Each selection value is based on, e.g., proportional to, user selections of search results that referenced a resource to which the selection value corresponds. For each of the search terms (e.g., "Fuji", "climb Fuji", "Fuji singer", etc.), for example, counts can be maintained of user selections of search results that referenced each of the resources 205 (e.g., resources "A", "B", and "N"). Upon submitting the search term "Fuji singer", for example, users may rarely (if ever) select search results including a reference to "Resource A" (e.g., a document about Fuji apples) or "Resource B" (e.g., a document about Fuji apples and Mount Fuji), however, users may sometimes select search results including a reference to "Resource N" (e.g., a document about Fuji apples, Mount Fuji, and Keiko Fuji).

In some implementations, selection values can be a ratio of a first value to a second value, the first value being proportional to a number of times that search results in response to a query that included the search term were selected by users (i.e., a "selection"), and the second value being proportional to a number of times that the resource was referenced by search results in response to a query that included the search term (i.e., an "impression"). Such a ratio may generally be referred to as an "impression fraction", for example, and may be based on user interactions with search results pages including the search results. For example, if a user were to select (e.g., "click") a search result from a search result page, the presentation may be counted as an impression and the interaction may be counted as a selection, whereas if the user were to skip the search result (e.g., by selecting a subsequent search result or requesting a subsequent search result page without selecting the search result), the presentation may be counted as an impression only.

As shown in FIG. 2, for example, the selection values 230 may be logically represented by a matrix of values for each search term and for each resource. The selection values 230, for example, represent only a small portion of the possible resources and search terms which may be evaluated by the search engine 110, and are shown here for illustrative purposes. As the resulting matrix for all possible resources and search terms may be vast and sparse, other data structures may be used, such as data structures associated with distributed databases.

In the present example, for the search term "Fuji", corresponding search results may have included references to each of the resources "A", "B", and "N". If search results referring to "Resource A" (including a reference to Fuji apples) had been presented one thousand times in response to search queries including the search term "Fuji", for example, and if the search results were selected by users two hundred times, the selection value of "Resource A" for the search term "Fuji" may be 0.2 (e.g., two hundred divided by one thousand). Further, in the present example, the selection value of "Resource B" (including references to Fuji apples and Mount Fuji) may be 0.5, and the selection value of "Resource N" (including references to Fuji apples, Mount Fuji, and Keiko Fuji) may be 0.6, for the search term "Fuji". For the search term "climb Fuji", for example, resources "A", "B", and "N" may be associated with respective selection values of 0.0, 0.9, and 0.3. For the search term "Fuji singer", for example, resources "A", "B", and "N" may be associated with respective selection values of 0.0, 0.0, and 0.4. Other appropriate scoring processes can also be used.

In some implementations, confidence scores can be associated with each of the selection values 230. For example, a continuous function can be used to associate a high confidence score with selection values that are based on a large number of impressions, and to associate a low confidence score with selection values that are based on a small number of impressions. Confidence scores can be used with entity weight scores, for example, when determining search term-entity selection values for each of a set of entities.

For each search term and each entity, a search term-entity selection value is determined (306). For example, the search term-entity selection evaluator 120 can access data associated with the resources 205, and can reference the selection values 230 for each resource to determine search term-entity selection values 240 for each of the entities referenced in the resources. In the present example, each of the entities "Fuji apples", "Mount Fuji", and "Keiko Fuji" is referenced in one or more of the resources 205. Also in the present example, selection values are available for each of the resources 205 for the search terms "Fuji", "climb Fuji", and "Fuji singer".

Search term-entity selection values are based on the selection values of resources that reference the entity and that were referenced by search results in response to a query that included the search term. For example, each of the resources "A", "B", and "N" reference the entity "Fuji apples". To determine the search term-entity selection value for the search term "Fuji" and the entity "Fuji apples", for example, the search term-entity selection evaluator 120 can aggregate the selection values for the search term "Fuji", for each of the resources which reference the entity (e.g., resources "A", "B", and "N").

In some implementations, aggregating selection values may include a summation of the respective impression fractions. For example, if the respective impression fractions for the search term "Fuji" for the resources "A", "B", and "N", were 200/1000, 1500/3000, and 6000/10000, an aggregated search term-entity selection value for the search term "Fuji" and the entity "Fuji apples" may be calculated as (200+1500+6000)/(1000+3000+10000), or 0.55. As another example, each of the respective impression fractions may be normalized and then a central tendency computed, such as a mean or a median.

In some implementations, determining search term-entity selection values may be based at least in part on confidence and/or weight scores for resource selection values. For example, each of the selection values 230 for the search term "Fuji" for the resources "A", "B", and "N" may be associated with a confidence score that exceeds a predetermined threshold which indicates that the values are to be used for determining search term-entity selection values. As "Resource A" references a single entity ("Fuji apples"), for example, the entity may be associated with a full weight score for the resource. As "Resource B" and "Resource N" each reference one or more entities in addition to "Fuji apples", for example, the entity may be associated with a partial weight score for the resource, proportional to its significance within the resource.

When determining a search term-entity selection value for the search term "Fuji" and the entity "Fuji apples", for example, the selection value (e.g., an impression fraction) for the search term "Fuji" and "Resource A" (e.g., 0.2) can be multiplied its entity weight score (e.g., 1.00), the selection value for the search term and "Resource B" (e.g., 0.5) can be multiplied by its entity weight score (e.g., 0.50), and the selection value for the search term and "Resource N" (e.g., 0.6) can be multiplied by its entity weight score (e.g., 0.33). In the present example, the respective weighted selection values for the entity "Fuji apples" can be averaged, and an aggregated search term-entity selection value of 0.22 can be determined for the search term "Fuji" and the entity "Fuji apples". Further, in the present example, a search term-entity selection value of 0.18 may be determined for the entity "Fuji apples" and the search term "climb Fuji", and a value of 0.04 may be determined for the search term "Fuji singer". For the entity "Mount Fuji", for example, search term-entity selection values of 0.23, 0.28, and 0.07 may be determined for the respective search terms "Fuji", "climb Fuji", and "Fuji singer". For the entity "Keiko Fuji", for example, search term-entity selection values of 0.20, 0.10, and 0.13 may be determined for the respective search terms "Fuji", "climb Fuji", and "Fuji singer".

Search term-entity selection values are stored (308) in data storage. For example, the search term-entity selection evaluator 120 can store the search term-entity selection values 240 as search term-entity selection data 122, for use in adjusting resource rankings for search operations.

Figure 4:
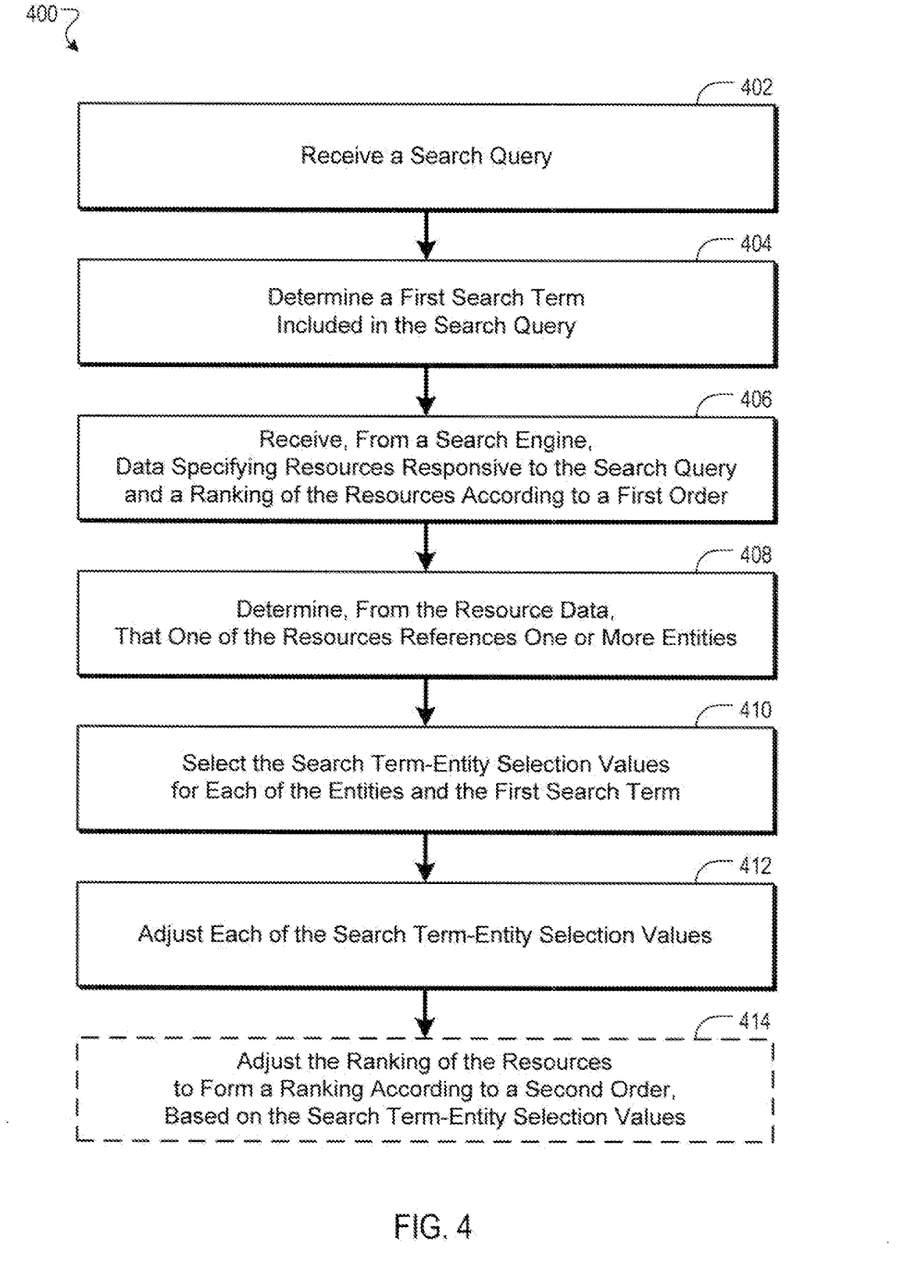
FIG. 4 is a flow diagram of an example process for adjusting a resource ranking for a search operation based on search term-entity selection values for a resource.

With respect to FIG. 4, an example process 400 is described for adjusting a resource ranking for a search operation based on search term-entity selection values for a resource. The process 400 can be implemented by data processing apparatus such as the search engine 110 (shown in FIG. 1) and the search score adjuster 130 (also shown in FIG. 1), for example.

A search query is received (402). For example, the search engine 110 can receive a search query from a user of one of the user devices 106. The search query, for example, can include text and/or spoken input, such as the phrase "How can I climb Fuji?"

A first search term included in the search query is determined (404). For example, the search engine 110 can process (e.g., transcribe, parse, tokenize, etc.) the received search query to determine that the query includes the search term "climb Fuji".

Data is received (406) from a search engine, the data specifying resources responsive to the search query, and a ranking of the resources according to a first order. For example, the search engine 110 can reference the index 112 which may include data relevant to each of the resources 205 (e.g., resources "A", "B", and "N"), and which may include data relevant to one or more newly available resources. A resource 210z (identified as "Resource Z"), for example, may be a new resource which is not yet associated with any search terms data 220. The ranking can be indicative of the responsiveness of each of the resources relative to each of the other resources. For example, the search engine 110 can rank the resources "A", "B", "N", and "Z", according to factors such as relevance and importance. Data specifying the resources and the initial ranking of the resources, for example, can be provided by the search engine 110 to the search score adjuster 130.

From the resource data, a determination (408) can be made that one of the resources references one or more entities. For example, the search score adjuster 130 can determine that "Resource Z" references multiple entities (e.g., Mount Fuji and Keiko Fuji). As another example, a resource may reference a single entity.

For each of the entities of the plurality of entities and the first search term, search term-entity selection values are selected (410). In the present example, for the entity "Mount Fuji" and the search term "climb Fuji", the search score adjuster 130 can select the search term-entity selection value of 0.28. For the entity "Keiko Fuji" and the search term "climb Fuji", for example, the search score adjuster 130 can select the search term-entity selection value of 0.10.

Each of the selected search term-entity selection values are adjusted (412). In some implementations, the search term-entity selection values can be adjusted in inverse proportion to a cardinality of the set of entities. For example, if each of the entities referenced by "Resource Z" is associated with an equivalent weight score, each of the search term-entity selection values may be adjusted by an equivalent proportion. In the present example, as "Resource Z" is associated with two entities (e.g., Mount Fuji and Keiko Fuji), each of the selected search term-entity selection values can be adjusted by half. As another example, if each of the entities referenced by "Resource Z" were to be associated with different weight scores, each of the search term-entity selection values may be adjusted differently. For example, a search term-entity selection value associated with a high weight score may be adjusted to a lesser degree than a search term-entity selection value associated with a low weight score.

In some implementations, a central tendency of the search term-entity selection values can be determined and can be used as a factor for adjusting the ranking of resources. For example, the search term-entity selection values for each of the entities referenced by "Resource Z" with respect to the search term "climb Fuji" may be aggregated (e.g., through summing and/or averaging, weighted averaging, etc.) to identify the resource's overall relevance to the search term. In the present example, the search score adjuster 130 can determine an averaged search term-entity selection value for the search term "climb Fuji" and the entity "Mount Fuji" (e.g., 0.28) and the entity "Keiko Fuji" (e.g., 0.10), as a value of 0.19. As another example, a maximum or minimum search term-entity selection value can be used for adjusting resource ranking. For example, if the search term-entity selection value associated with the entity "Mount Fuji" and the search term "climb Fuji" were to be used (e.g., 0.28, a maximum value), "Resource Z" may be boosted with regard to the search term, as the search term-entity selection value is relatively higher than that of other entities for the search term. If the search term-entity selection value associated with the entity "Keiko Fuji" and the search term "climb Fuji" were to be used (e.g., 0.10, a minimum value), "Resource Z" may be demoted with regard to the search term, as the search term-entity selection value is relatively lower than that of other entities for the search term. In some implementations, other mechanisms for determining a central tendency of multiple search term-entity selection values may be employed, such as identifying a median, a mode, etc.

In some implementations, based on the search term-entity selection values, the ranking of the resources can be adjusted (414) to form a ranking of the resources according to a second order. At least one of the resources can be ranked differently (e.g., higher or lower) in the second order, relative to its ranking in the first order. For example, an initial ranking of "Resource Z" by the search engine may be relatively low, due at least in part to the absence of selection value data for the resource. In general, when a resource references one or more entities that have been referenced by other resources that have generally performed well (e.g., are associated with high selection values) in response to particular search terms, the resource may be promoted or "boosted" for the search terms. In the present example, the search score adjuster 130 can adjust the ranking of resources to rank "Resource Z" higher in the second order, based at least in part on its reference to the entity "Mount Fuji", and a relatively high performance for the search term "climb Fuji" for other resources that have referred to Mount Fuji. Thus, resources that do not have sufficient search and selection data from which a reliable performance inference can be drawn can still be boosted or demoted.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   accessing, by the data processing apparatus, resource data that specifies, for each of a plurality of resources:
   a resource identifier that uniquely identifies the resource; and
   one or more entities referenced in the resource;
   accessing, by the data processing apparatus, search term data that specifies:
   a plurality of search terms; and
   for each search term, a selection value for each resource, each selection value being based on user selections of search results that referenced the resource to which the selection value corresponds and that were provided in response to a query that included the search term, wherein the selection value for each resource is a ratio of a first value to a second value, the first value being proportional to a number of times that search results that referenced the resource were provided in response to a query that included the search term and were selected by users, and the second value being proportional to a number of times that the resource was referenced by search results that were provided in response to a query that included the search term;

determining, by the data processing apparatus, from the resource data and search term data, for each search term and each entity, a search term-entity selection value that is based on aggregating the selection values of resources that reference the entity and that were referenced by search results in response to a query that included the search term, wherein the search term-entity selection value is proportional to the aggregated selection values of resources that reference the entity; and storing, by the data processing apparatus, the search term-entity selection values in a data storage.

2. The method of claim 1, further comprising:

receiving, by the data processing apparatus, a search query;

determining a first search term included in the search query;

receiving, from a search engine, data specifying:
resources responsive to the search query; and
a ranking of the resources according to a first order, the ranking being indicative of the responsiveness of each of the resources relative to each of the other resources;

determining, from the resource data, that one of the resources references a first entity;

selecting the search term-entity selection value for the first entity and the first search term;

adjusting, based on the search term-entity selection value, the ranking of the resources to form a ranking of the resources according to a second order, wherein one of the resources is ranked in the second order different from its ranking in the first order.

3. The method of claim 2, wherein adjusting the ranking of the resources comprises adjusting the ranking of the one of the resources so that it is ranked higher in the second order than in the first order.

4. The method of claim 1, further comprising:

receiving, by the data processing apparatus, a search query;

determining a first search term included in the search query;

receiving, from a search engine, data specifying:
resources responsive to the search query; and
a ranking of the resources according to a first order, the ranking being indicative of the responsiveness of each of the resources relative to each of the other resources;

determining, from the resource data, that one of the resources references a set of entities;

selecting the search term-entity selection values for each of the entities of the plurality of entities and the first search term; and adjusting each of the search term-entity selection values in inverse proportion to a cardinality of the set of entities.

5. The method of claim 4, further comprising adjusting, based on the search term-entity selection values, the ranking of the resources to form a ranking of the resources according to a second order, wherein one of the resources is ranked in the second order different from its ranking in the first order.

6. The method of claim 5, wherein adjusting, based on the search term-entity selection values, comprises:

determining a central tendency of the search term-entity selection values; and adjusting the ranking of the resources based on the central tendency of the search term-entity selection values.

7. The method of claim 1, wherein the entities referenced in the resources are instances of noun classes.

8. Software stored in a computer readable storage device and including instructions executable by a data processing apparatus and upon such execution cause the data process apparatus to perform operations comprising:

accessing, by the data processing apparatus, resource data that specifies, for each of a plurality of resources:
a resource identifier that uniquely identifies the resource; and
one or more entities referenced in the resource;

accessing, by the data processing apparatus, search term data that specifies:
a plurality of search terms; and
for each search term, a selection value for each resource, each selection value being based on user selections of search results that referenced the resource to which the selection value corresponds and that were provided in response to a query that included the search term, wherein the selection value for each resource is a ratio of a first value to a second value, the first value being proportional to a number of times that search results that referenced the resource were provided in response to a query that included the search term and were selected by users, and the second value being proportional to a number of times that the resource was referenced by search results that were provided in response to a query that included the search term;

determining, by the data processing apparatus, from the resource data and search term data, for each search term and each entity, a search term-entity selection value that is based on aggregating the selection values of resources that reference the entity and that were referenced by search results in response to a query that included the search term, wherein the search term-entity selection value is proportional to the aggregated selection values of resources that reference the entity; and storing, by the data processing apparatus, the search term-entity selection values in a data storage.

9. The software stored in a computer readable storage device of claim 8, wherein execution of the instructions by the data processing apparatus causes the data process apparatus to perform operations further comprising:

receiving, by the data processing apparatus, a search query;

determining a first search term included in the search query;

receiving, from a search engine, data specifying:
resources responsive to the search query; and
a ranking of the resources according to a first order, the ranking being indicative of the responsiveness of each of the resources relative to each of the other resources;

determining, from the resource data, that one of the resources references a first entity;

selecting the search term-entity selection value for the first entity and the first search term;

adjusting, based on the search term-entity selection value, the ranking of the resources to form a ranking of the resources according to a second order, wherein one of the resources is ranked in the second order different from its ranking in the first order.

10. The software stored in a computer readable storage device of claim 8, wherein execution of the instructions by the data processing apparatus causes the data process apparatus to perform operations further comprising:
- receiving, by the data processing apparatus, a search query;
- determining a first search term included in the search query;
- receiving, from a search engine, data specifying:
  - resources responsive to the search query; and
  - a ranking of the resources according to a first order, the ranking being indicative of the responsiveness of each of the resources relative to each of the other resources;
- determining, from the resource data, that one of the resources references a set of entities;
- selecting the search term-entity selection values for each of the entities of the plurality of entities and the first search term; and
- adjusting each of the search term-entity selection values in inverse proportion to a cardinality of the set of entities.

11. The software stored in a computer readable storage device of claim 10, wherein execution of the instructions by the data processing apparatus causes the data process apparatus to perform operations further comprising adjusting, based on the search term-entity selection values, the ranking of the resources to form a ranking of the resources according to a second order, wherein one of the resources is ranked in the second order different from its ranking in the first order.

12. The software stored in a computer readable storage device of claim 11, wherein adjusting, based on the search term-entity selection values, comprises:
- determining a central tendency of the search term-entity selection values; and
- adjusting the ranking of the resources based on the central tendency of the search term-entity selection values.

13. A system, comprising:
- a data processing apparatus; and
- a computer readable storage device including instructions executable by the data processing apparatus and upon such execution cause the data process apparatus to perform operations comprising:
  - accessing, by the data processing apparatus, resource data that specifies, for each of a plurality of resources:
    - a resource identifier that uniquely identifies the resource; and
    - one or more entities referenced in the resource;
  - accessing, by the data processing apparatus, search term data that specifies:
    - a plurality of search terms; and
    - for each search term, a selection value for each resource, each selection value being based on user selections of search results that referenced the resource to which the selection value corresponds and that were provided in response to a query that included the search term, wherein the selection value for each resource is a ratio of a first value to a second value, the first value being proportional to a number of times that search results that referenced the resource were provided in response to a query that included the search term and were selected by users, and the second value being proportional to a number of times that the resource was referenced by search results that were provided in response to a query that included the search term;
  - determining, by the data processing apparatus, from the resource data and search term data, for each search term and each entity, a search term-entity selection value that is based on aggregating the selection values of resources that reference the entity and that were referenced by search results in response to a query that included the search term, wherein the search term-entity selection value is proportional to the aggregated selection values of resources that reference the entity; and
  - storing, by the data processing apparatus, the search term-entity selection values in a data storage.

14. The system of claim 13, wherein execution of the instructions by the data processing apparatus causes the data process apparatus to perform operations further comprising:
- receiving, by the data processing apparatus, a search query;
- determining a first search term included in the search query;
- receiving, from a search engine, data specifying:
  - resources responsive to the search query; and
  - a ranking of the resources according to a first order, the ranking being indicative of the responsiveness of each of the resources relative to each of the other resources;
- determining, from the resource data, that one of the resources references a first entity;
- selecting the search term-entity selection value for the first entity and the first search term;
- adjusting, based on the search term-entity selection value, the ranking of the resources to form a ranking of the resources according to a second order, wherein one of the resources is ranked in the second order different from its ranking in the first order.

15. The system of claim 13, wherein execution of the instructions by the data processing apparatus causes the data process apparatus to perform operations further comprising:
- receiving, by the data processing apparatus, a search query;
- determining a first search term included in the search query;
- receiving, from a search engine, data specifying:
  - resources responsive to the search query; and
  - a ranking of the resources according to a first order, the ranking being indicative of the responsiveness of each of the resources relative to each of the other resources;
- determining, from the resource data, that one of the resources references a set of entities;
- selecting the search term-entity selection values for each of the entities of the plurality of entities and the first search term; and
- adjusting each of the search term-entity selection values in inverse proportion to a cardinality of the set of entities.

16. The system of claim 15, wherein execution of the instructions by the data processing apparatus causes the data process apparatus to perform operations further comprising adjusting, based on the search term-entity selection values, the ranking of the resources to form a ranking of the resources according to a second order, wherein one of the resources is ranked in the second order different from its ranking in the first order.

17. The system of claim 16, wherein adjusting, based on the search term-entity selection values, comprises:
   determining a central tendency of the search term-entity selection values; and
   adjusting the ranking of the resources based on the central tendency of the search term-entity selection values.

* * * * *

UNITED STATES PATENT AND TRADEMARK OFFICE
CERTIFICATE OF CORRECTION

| | | |
|---|---|---|
| PATENT NO. | : 10,303,684 B1 | Page 1 of 1 |
| APPLICATION NO. | : 14/011463 | |
| DATED | : May 28, 2019 | |
| INVENTOR(S) | : Kurihara | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1425 days.

Signed and Sealed this
Nineteenth Day of May, 2020

Andrei Iancu
*Director of the United States Patent and Trademark Office*